(12) United States Patent
Tsuchitani et al.

(10) Patent No.: US 9,470,960 B2
(45) Date of Patent: Oct. 18, 2016

(54) PROJECTOR

(71) Applicant: Seiko Epson Corporation, Tokyo (JP)

(72) Inventors: Hiroshi Tsuchitani, Shiojiri (JP);
Kenichi Asami, Azumino (JP);
Masatoshi Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 84 days.

(21) Appl. No.: 14/284,586

(22) Filed: May 22, 2014

(65) Prior Publication Data
US 2014/0354958 A1    Dec. 4, 2014

(30) Foreign Application Priority Data

Jun. 4, 2013   (JP) ................. 2013-117623

(51) Int. Cl.
*G03B 21/16*   (2006.01)

(52) U.S. Cl.
CPC .................. *G03B 21/16* (2013.01)

(58) Field of Classification Search
CPC ..... G02F 1/1333; G03B 21/16; G03B 21/14; H04N 5/74; H05K 7/20
USPC ............................ 353/58, 57, 61
See application file for complete search history.

(56) References Cited

U.S. PATENT DOCUMENTS

| | | | | |
|---|---|---|---|---|
| 8,282,218 B2 * | 10/2012 | Koyama | ............... | G03B 21/16 353/57 |
| 2008/0252858 A1 * | 10/2008 | Zheng | ................... | G03B 21/16 353/58 |
| 2012/0257172 A1 | 10/2012 | Shirakura | | |

FOREIGN PATENT DOCUMENTS

| | | |
|---|---|---|
| JP | 2003-107581 A | 4/2003 |
| JP | 2004-264759 A | 9/2004 |
| JP | 2010-74671 A | 4/2010 |
| JP | 2012-226298 A | 11/2012 |

* cited by examiner

*Primary Examiner* — Steven H Whitesell Gordon
*Assistant Examiner* — Jerry Brooks
(74) *Attorney, Agent, or Firm* — ALG Intellectual Property, LLC

(57) ABSTRACT

A projector includes a light source apparatus, a light modulator that modulates a light flux outputted from the light source apparatus in accordance with image information, a projection lens that projects the light flux modulated by the light modulator, an exterior enclosure that accommodates the light source apparatus, the light modulator, and the projection lens, an exhaust fan (first exhaust fan) that exhausts air inside the exterior enclosure out thereof through an exhaust port (first light source exhaust port) provided in the exterior enclosure, and a functional device (wireless device) that provides a predetermined function and is heated to a temperature higher than the temperature of the exhaust air from the first exhaust fan. The wireless device is disposed in a position downstream of the first exhaust fan, and part of the exhaust air discharged from the first exhaust fan flows to the wireless device.

9 Claims, 5 Drawing Sheets

PROJECTOR

BACKGROUND

1. Technical Field

The present invention relates to a projector.

2. Related Art

There is a known projector of related art that modulates a light flux outputted from a light source apparatus in accordance with image information and projects the modulated light flux through a projection lens. A projector of this type includes a cooling mechanism formed, for example, of a cooling fan to reduce the amount of heat generated by a component of the projector due to light emission operation of a light source.

On the other hand, recent advances in wireless transmission technologies lead to a proposed system including a receiver that receives a video signal wirelessly transmitted from an external apparatus (see JP-A-2010-74671, for example).

JP-A-2012-226298 discloses a cooling mechanism including (a) a light modulator, (b) a projection lens, (c) a first controller for driving the light modulator, (d) a second controller for providing a predetermined function, (e) an exterior enclosure that accommodates the light modulator, the first controller, and the second controller, (f) a first fan that introduces air outside the exterior enclosure through a suction port into the exterior enclosure, (g) a second fan that exhausts the air that has been introduced through the suction port and is present in the exterior enclosure out of the exterior enclosure through an exhaust port, (h) a first channel along which the air introduced by the driven first fan through the suction port is guided to the light modulator, and (i) a second channel along which the air in the exterior enclosure is guided by the driven second fan via the second controller to the second fan.

JP-A-2012-226298, however, discloses a configuration in which a negative pressure produced by the driven second fan is used to cool the second controller. The configuration is therefore effective when the distance between the suction port and the exhaust port is short, whereas when the distance is long, it is necessary to not only ensure a negative pressure necessary for the cooling but also, for example, increase the speed of rotation of the second fan or otherwise increase the performance thereof and increase the airtightness of the second channel.

Further, when the second controller is heated to a temperature higher than the temperature of the exhaust air caused to flow by the second fan, it is conceivable to dispose the second controller in a position facing a discharge port of the second fan so that exhaust air discharged from the second fan cools the second controller. In this case, however, the second controller blocks the exhaust port, which faces the discharge port, undesirably resulting in insufficient cooling of the second controller and other heated components in the projector.

It has therefore been desired to provide a projector capable of efficiently cooling a component heated to a temperature higher than the temperature of air exhausted from an exhaust fan.

SUMMARY

An advantage of some aspects of the invention is to solve at least a part of the problems described above, and the invention can be implemented as the following aspects or application examples.

Application Example 1

This application example is directed to a projector including a light source apparatus, a light modulator that modulates a light flux outputted from the light source apparatus in accordance with image information, and a projection lens that projects the light flux modulated by the light modulator, wherein the projector further includes (a) an exterior enclosure that accommodates the light source apparatus, the light modulator, and the projection lens, (b) an exhaust fan that exhausts air inside the exterior enclosure out thereof through an exhaust port provided in the exterior enclosure, and (c) a functional device that provides a predetermined function and is heated to a temperature higher than the temperature of the exhaust air from the exhaust fan, and the functional device is disposed in a position downstream of the exhaust fan, and part of the exhaust air discharged from the exhaust fan flows to the functional device.

According to this projector, the functional device, which is heated to a temperature higher than the temperature of exhaust air from the exhaust fan, is disposed in a position downstream of the exhaust fan, and part of the exhaust air discharged from the exhaust fan flows to the functional device. The configuration allows not only part of the exhaust air to cool the functional device but also the remainder of the exhaust air to be exhausted through the exhaust port to cool members in positions upstream of the exhaust fan (light source apparatus and light modulator, for example). Further, since the exhaust air discharged from the exhaust fan is used to perform positive-pressure-based cooling on the functional device, a necessary amount of cooling air can be readily provided unlike negative-pressure-based cooling, resulting in an improvement in cooling efficiency.

Application Example 2

In the projector according to the application example described above, it is preferable that the functional device is disposed in a position shifted from a discharge port of the exhaust fan.

According to this projector, since the functional device is disposed in a position shifted from the discharge port of the exhaust fan, the functional device does not block the exhaust air discharged through the discharge port and exhaust air other than part of the exhaust air that cools the functional device can be exhausted through the exhaust port, whereby the functional device can be cooled and the light source apparatus, the light modulator, and other components can be efficiently cooled.

Application Example 3

In the projector according to the application example described above, it is preferable that the exterior enclosure has a second exhaust port through which the exhaust air having flowed along the functional device is exhausted out of the exterior enclosure.

According to this projector, providing the exterior enclosure with the second exhaust port allows the exhaust air having flowed along the functional device and absorbed heat therefrom to be efficiently exhausted out of the exterior enclosure, whereby the functional device can be more efficiently cooled.

Application Example 4

In the projector according to the application example described above, it is preferable that the projector further includes an exhaust duct through which the exhaust air discharged from the exhaust fan flows, and the exhaust duct includes an exhaust-port-side duct through which the exhaust air flows to the exhaust port and a functional-device-side duct through which the exhaust air flows to the functional device.

According to this projector, using the functional-device-side duct allows part of the exhaust air discharged from the exhaust fan to efficiently flow to the functional device. Further, using the exhaust-port-side duct allows the remainder of the exhaust air to efficiently flow to the exhaust port. As a result, the light source apparatus, the light modulator, and other components including the functional device can be more efficiently cooled.

Application Example 5

In the projector according to the application example described above, it is preferable that the functional device is detachably disposed.

According to this projector, in which the function device is detachably disposed, two types of projector, a projector to which the function device is attached and a projector to which no function device is attached, can be readily provided, whereby a user has an increased range of options. Further, when the functional device is attached, the cooling described above can be made.

Application Example 6

In the projector according to the application example described above, it is preferable that the exterior enclosure includes a detachable cover member that covers an area where the functional device is disposed.

According to this projector, for example, when the functional device is attached, and the exterior shape of the functional device causes the shape of the exterior enclosure to be different from the shape of the exterior enclosure with no functional device attached thereto, the cover member can be formed in the different shape. On the other hand, to manufacture a projector to which no functional device is attached, a cover member that does not have the different shape can be attached to the exterior enclosure. Therefore, the exterior enclosure excluding the cover member can be used as a common part, and a cover member having a shape according to whether or not the function device can be attached. As a result, in accordance with whether or not the function device is attached to the projector, the projector can be manufactured in improved convenience, and the quality of the exterior appearance of the projector can be improved.

Application Example 7

In the projector according to the application example described above, it is preferable that the cover member has the second exhaust port.

According to this projector, when the functional device is attached, forming the second exhaust port in a cover member that has a shape according to the functional device and forms part of the exterior enclosure allows the quality of the exterior appearance of the projector to be improved and the functional device to be efficiently cooled.

Application Example 8

In the projector according to the application example described above, it is preferable that the functional device is a wireless device capable of wireless communication, and that a receiver or a transmitter of the wireless device faces in a direction in which a light flux exits out of the projection lens.

According to this projector, since the functional device is a wireless device capable of wireless communication, efficiently cooling the wireless device allows stable wireless communication with an external apparatus. Further, since a transmission device is typically disposed in a position between the projector and a projection surface and the receiver or the transmitter of the wireless device faces the direction in which a light flux exits out of the projection lens, the number of obstacles that are present between the projector and the projection surface and interfere the wireless communication can be reduced for reliable communication between the wireless device and the transmission device.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will be described below with reference to the drawings.

Embodiment

Figure 1:
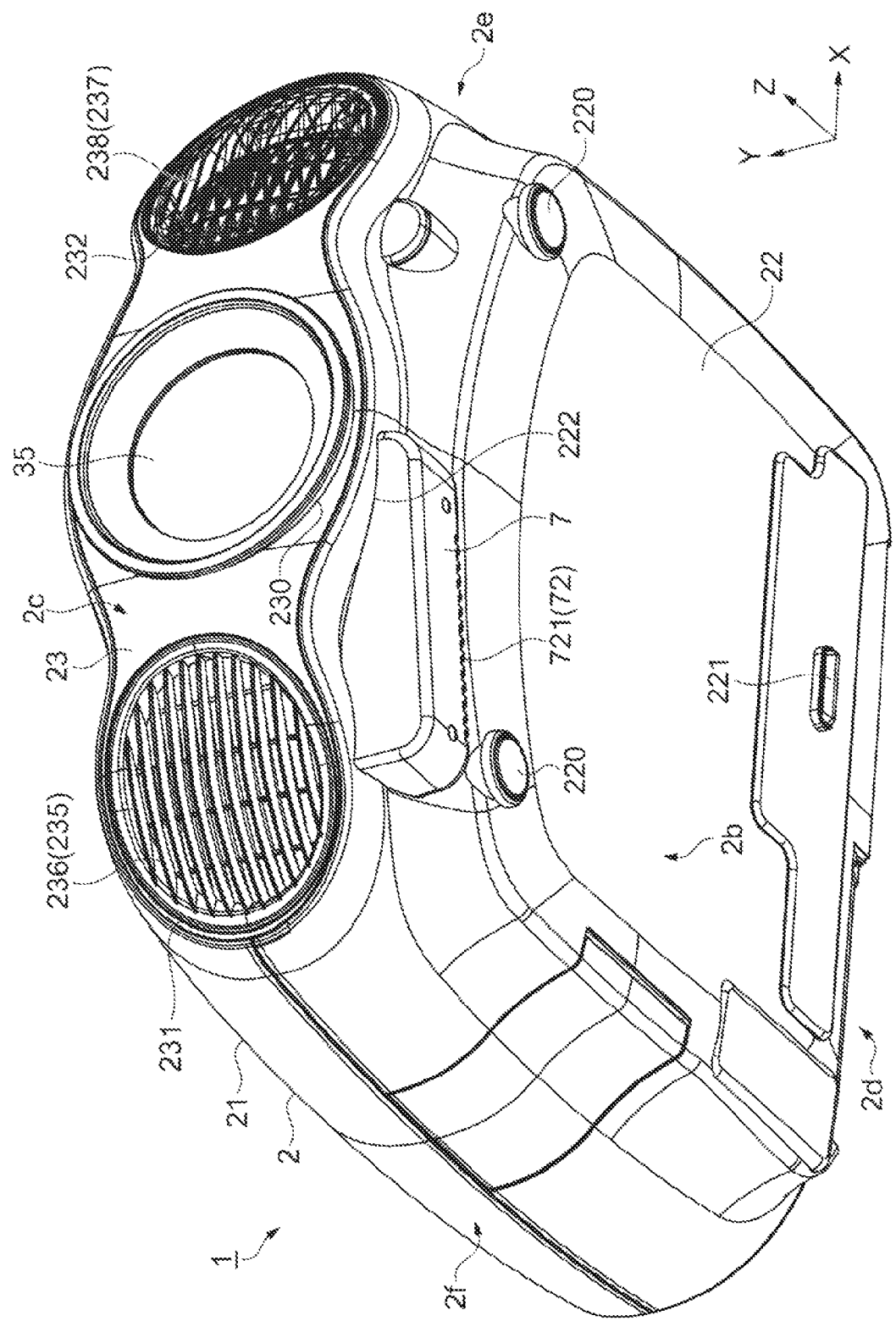
FIG. 1 is an exterior perspective view of a projector according to an embodiment.
Figure 2:
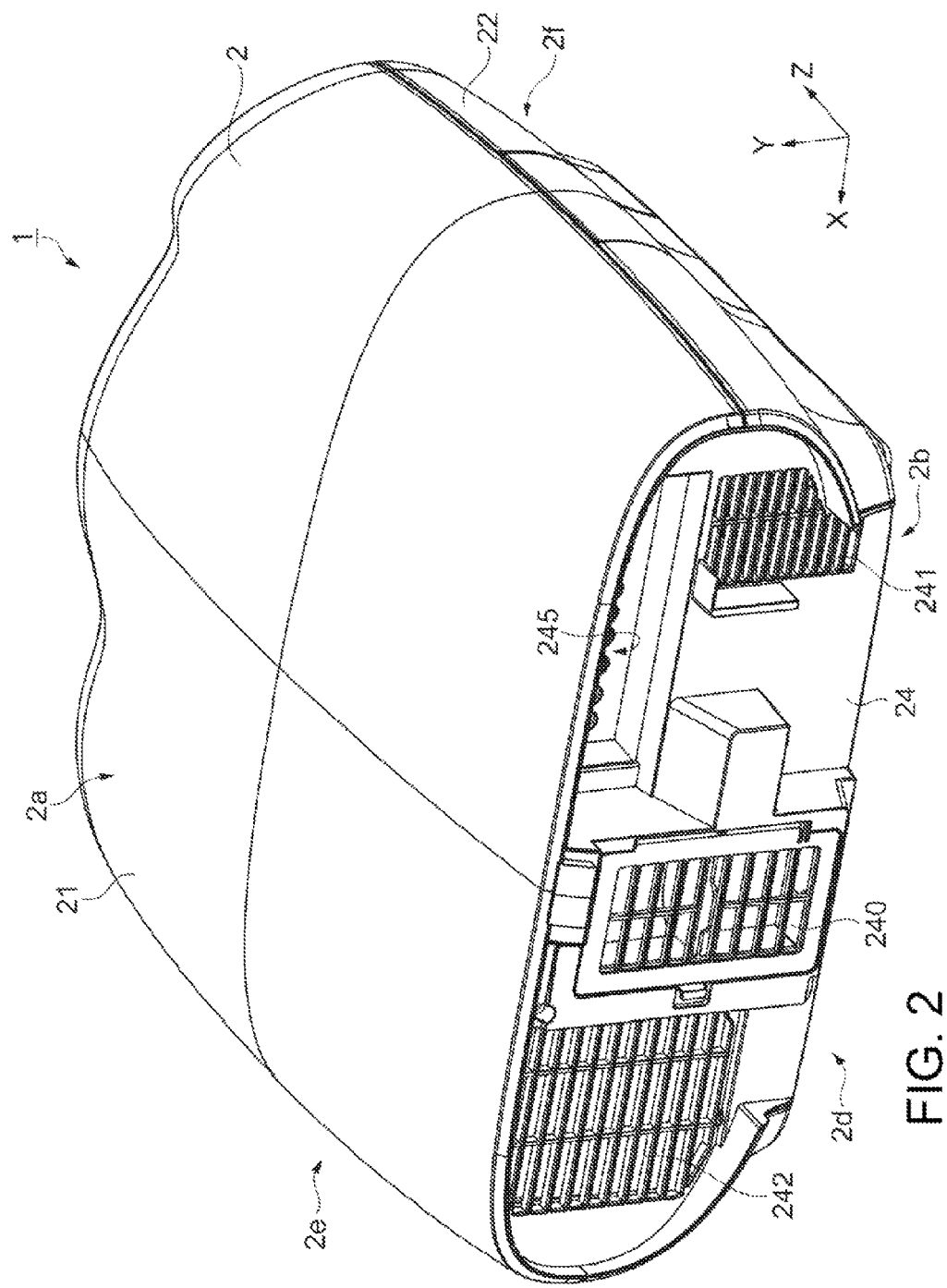
FIG. 2 is another exterior perspective view of the projector.

FIGS. 1 and 2 are exterior perspective views of a projector 1 according to the embodiment. Specifically, FIG. 1 is a perspective view of the projector 1 viewed in an obliquely upward direction from the side where a front surface 2c is present, and FIG. 2 is a perspective view of the projector 1 viewed in an obliquely downward direction from the side where a rear surface 2d is present.

In the following figures including FIG. 1, an XYZ orthogonal coordinate system is added thereto and used as appropriate for ease of description. In the XYZ orthogonal coordinate system, a Z axis (+Z direction) represents a direction in which image light is projected from the projector 1. An X axis is an axis perpendicular to the Z axis and extending horizontally (rightward and leftward) (+X direction represents rightward direction when front end surface of projection lens 35 is viewed from front), and a Y axis is an axis perpendicular to the Z and X axes and extending vertically (upward and downward) (+Y direction represents upward direction when front end surface of projection lens 35 is viewed from front).

The projector 1 according to the present embodiment is covered with an exterior enclosure 2 having a substantially box-like shape, as shown in FIGS. 1 and 2. The exterior enclosure 2 is generally formed of an upper case 21, a lower case 22, a front case 23, and a rear case 24.

The upper case 21 forms an upper surface 2a of the exterior enclosure 2 and an upper (+Y-direction-side) portion of each of a right surface 2e and a left surface 2f of the exterior enclosure 2. The lower case 22 forms a lower surface 2b of the exterior enclosure 2 and a lower (−Y-direction-side) portion of each of the right surface 2e and the left surface 2f of the exterior enclosure 2. The front case 23 forms a front surface 2c of the exterior enclosure 2, and the rear case 24 forms a rear surface 2d of the exterior enclosure 2. The exterior enclosure 2 has a curved shape that connects the upper surface 2a to the right surface 2e and the left surface 2f. In the present embodiment, the exterior enclosure 2 is formed of a synthesized resin member.

A projection opening 230 is formed in a central portion of the front case 23, and a projection lens 35 is exposed through the projection opening 230, as shown in FIG. 1. Further, an exhaust port (first light source exhaust port 231) having a substantially circular shape is formed in a position to the left of the projection lens 35 (on −X-direction side), and a louver member 235 having louvers 236, which extend in a substantially horizontal direction, is disposed in the first light source exhaust port 231. Moreover, an exhaust port (second light source exhaust port 232) having a substantially circular shape is formed in a position to the right of the projection lens 35 (on +X-direction side), and a louver member 237 having louvers 238, which extend in a substantially horizontal direction, is disposed in the second light source exhaust port 232, as in the case of the first light source exhaust port 231 on the left. The projector 1 according to the present embodiment has a configuration in which the first light source exhaust port 231 and the second light source exhaust port 232 are disposed in the front surface 2c in portions close to the left and right sides thereof.

Two legs 220, which change the angle at which the projector 1 performs projection, are disposed on a front (+Z-direction-side) portion of the lower surface 2b, and a fixed leg 221, which supports the installed projector 1, is disposed on a central rear (−Z-direction-side) portion of the lower surface 2b.

A cover member 7, which protrudes toward the lower surface 2b, is disposed at a front portion of the lower case 22 and below a portion extending from the first light source exhaust port 231 to the projection opening 230. A wireless device 8 (see FIG. 3) capable of wireless communication as a functional device described later is disposed inside the cover member 7.

An electro-optical device suction port 240, through which outside air for cooling an optical system including an electro-optical device described later is sucked, is formed in a central portion of the rear case 24, as shown in FIG. 2. Further, a first light source suction port 241, through which outside air for cooling a first light source apparatus 31, a power source apparatus 4, which will be described later, and other components is sucked, is formed in the rear case 24 in a position to the left (on −X-direction side) of the electro-optical device suction port 240. Moreover, a second light source suction port 242, through which outside air for cooling a second light source apparatus 32, which will be described later, and other components is sucked, is formed in the rear case 24 in a position to the right (on +X-direction side) of the electro-optical device suction port 240. The projector 1 according to the present embodiment has a configuration in which the rear surface 2d has the three suction ports: the electro-optical device suction port 240; the first light source suction port 241; and the second light source suction port 242.

A group of connection terminals 245, via which the projector 1 is connected to a variety of external apparatus and signals are transmitted and received, are disposed in a portion above the first light source suction port 241. The group of connection terminals 245 include connection terminals via which an image signal, an audio signal, and other signals can be inputted from an external apparatus (such as computer and video player). Examples of the connection terminals include an HDMI (registered trademark, high-definition multimedia interface) terminal, a video terminal, and an audio terminal.

Figure 3:
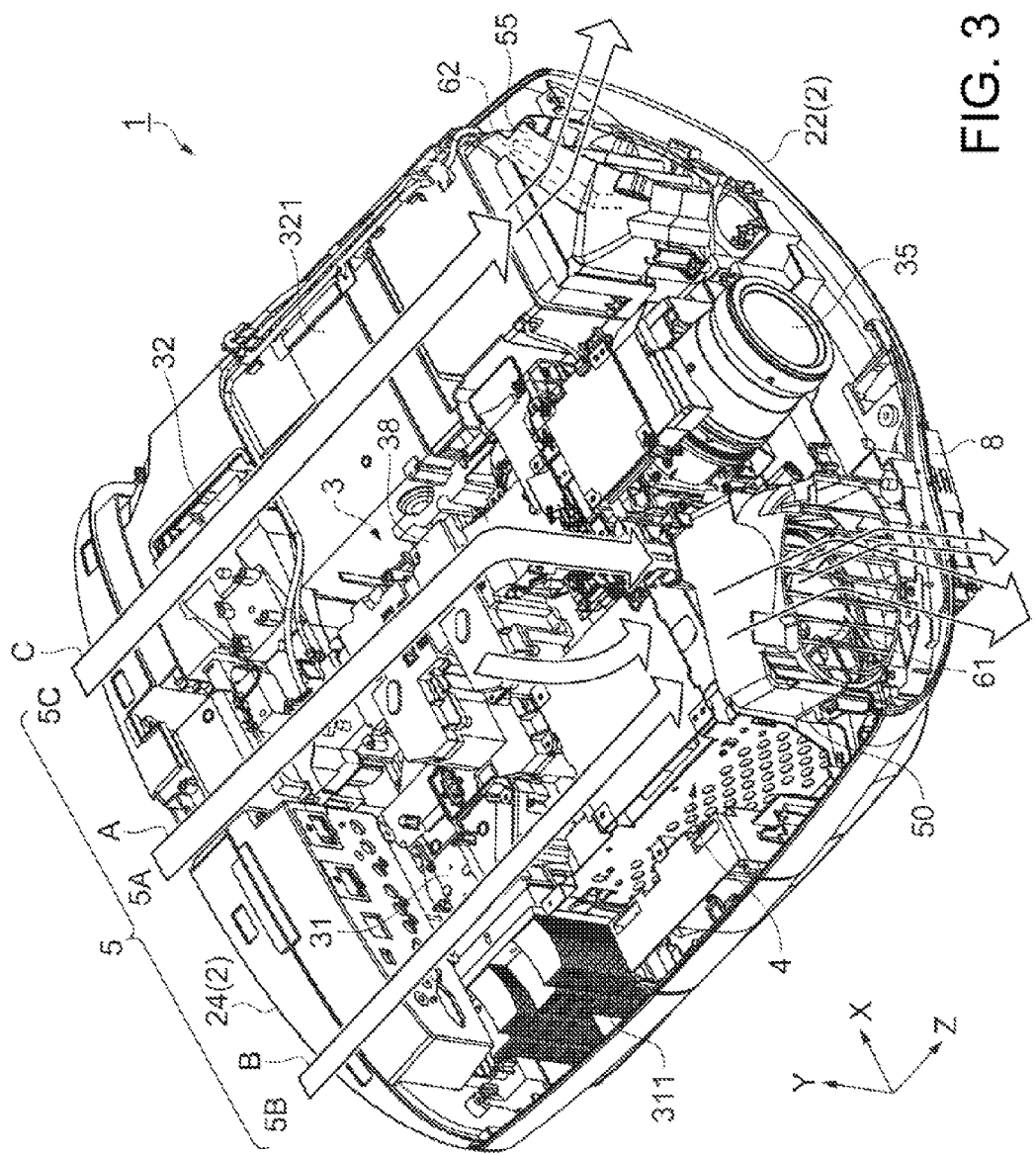
FIG. 3 is a schematic perspective view showing the configuration of the interior of an exterior enclosure.

FIG. 3 is a schematic perspective view showing the configuration of the interior of the exterior enclosure 2. FIG. 3 shows a state in which the upper case 21, the front case 23, a controller (not shown), the cover member 7, and other components are removed.

The projector 1 has the following components accommodated in the exterior enclosure 2 as shown in FIG. 3: an optical apparatus 3, which is a unit of components, the controller, the power source apparatus 4, which supplies the light source apparatus, the controller, and other components with electric power, and a cooling mechanism 5, which cools the interior of the projector 1.

The controller includes a CPU (central processing unit), a ROM (read only memory), and a RAM (random access memory), functions as a computer, and oversees and controls the action of the projector 1.

The optical apparatus 3 optically processes light outputted from the light source apparatus to form image light according to image information (image signal) and projects the image light under the control of the controller.

The configuration and action of the optical apparatus 3 will be schematically described.

The optical apparatus 3 in the present embodiment is formed of the light source apparatus (first light source apparatus 31 and second light source apparatus 32), a first illumination system, a second illumination system, a color separation system, electro-optical devices, a light combining system, and a projection system. Further, the optical apparatus 3 is a unit of the optical systems described above accommodated in an optical enclosure 38 as shown in FIG. 3.

The light source apparatus includes two light source apparatus, the first light source apparatus 31 and the second light source apparatus 32. Each of the optical apparatus is formed of a solid-state light source. In the present embodiment, each of the first light source apparatus 31 and the second light source apparatus 32 is formed of a laser light source that emits blue light.

In the second illumination system, a rotary fluorescent plate having a fluorescent layer converts light outputted from the second light source apparatus 32 (blue light) into fluorescence (color light) containing red light and green light, and the red fluorescence and the green fluorescence pass through polarization conversion elements and other components and impinge on the corresponding electro-optical devices (reflective light modulator for red light and reflective light modulator for green light) (neither of the components are shown).

The first illumination system causes light outputted from the first light source apparatus 31 (blue light) to travel through a diffuser plate, a rod integrator, a polarization conversion element, and other components and then the light to be incident on the corresponding electro-optical device (reflective light modulator for blue light) (neither of the components are shown).

The color separation system includes a dichroic mirror. The dichroic mirror separates the light having exited out of the second illumination system into the red light and the green light (neither of the components are shown).

The electro-optical devices are formed of reflective polarizers and reflective light modulators in correspondence with the red light, the green light, and the blue light (neither of the components are shown).

The red light and the green light separated by the color separation system are modulated by the corresponding electro-optical devices. Specifically, the red light and the green light pass through the corresponding reflective polarizers, are modulated by the corresponding reflective light modulators in accordance with image signals, and are reflected off the light modulators. The red light and green light having been modulated by and reflected off the corresponding light modulators are reflected off the corresponding reflective polarizers (neither of the components are shown).

The light having exited out of the first illumination system (blue light) is modulated by the corresponding electro-optical device. Specifically, the blue light passes through the corresponding reflective polarizer, is modulated by the corresponding reflective light modulator in accordance with an image signal, and is reflected off the light modulator. The blue light having been modulated by and reflected off the corresponding light modulator is reflected off the corresponding reflective polarizer (neither of the components are shown).

The light combining system is formed of a cross dichroic prism. The modulated color light fluxes reflected off the reflective polarizers are incident on corresponding surfaces of the cross dichroic prism (neither of the components are shown).

The modulated red light, green light, and blue light incident on the corresponding surfaces of the cross dichroic prism are combined with one another into image light, which exits out of the cross dichroic prism. The image light having exited out of the cross dichroic prism enters the projection lens 35, which forms the projection system, enlarged and projected on a projection surface, such as a screen (neither of the components are shown).

The cooling mechanism 5 according to the present embodiment will next be schematically described with reference to FIG. 3.

The cooling mechanism 5 according to the present embodiment is generally formed of three cooling mechanisms 5 (cooling mechanism 5A, cooling mechanism 5B, and cooling mechanism 5C). In FIG. 3, arrows A, B, and C, each of which indicates air flow in the corresponding cooling mechanism 5, are schematically drawn, and air actually flows inside and outside each component.

The cooling mechanism 5A causes outside air (air) sucked by a suction fan (sirocco fan, for example, but not shown) through the electro-optical device suction port 240 to flow along the first illumination system, the second illumination system, the electro-optical devices, and other components, for example, via a duct (not shown), as indicated by the arrow A. In the cooling mechanism 5A, a first exhaust fan 61 is driven to exhaust heated air having absorbed heat generated by the first illumination system, the second illumination system, the electro-optical devices, and other components via a first exhaust duct 50, which will be described later, out of the exterior enclosure 2 through the first light source exhaust port 231.

Further, in the cooling mechanism 5A, the driven first exhaust fan 61 also exhausts heated air having absorbed heat generated by the controller and other components and heated air in the exterior enclosure 2 out of the exterior enclosure 2 through the first light source exhaust port 231. The cooling mechanism 5A thus cools the first illumination system, the second illumination system, the electro-optical devices, the controller, and the interior of the exterior enclosure 2. The first exhaust fan 61 is an axial fan in the present embodiment.

The cooling mechanism 5B causes outside air (air) sucked by a suction fan (sirocco fan, for example, but not shown) through the first light source suction port 241 to flow along the first light source apparatus 31, the power source apparatus 4, and other components, for example, via a duct (not shown), as indicated by the arrow B. In the cooling mechanism 5B, the driven first exhaust fan 61 exhausts heated air having absorbed heat generated by the first light source apparatus 31, the power source apparatus 4, and other components via the first exhaust duct 50 out of the exterior enclosure 2 through the first light source exhaust port 231, as the cooling mechanism 5A does. The cooling mechanism 5B thus cools the first light source apparatus 31, the power source apparatus 4, and other components. The first light source apparatus 31 is specifically cooled by outside air caused to flow along a heat sink 311 connected to the first light source apparatus 31.

The first exhaust duct 50, which has a tubular shape, fixes the first exhaust fan 61 and allows the heated air (exhaust air) discharged from the first exhaust fan 61 to flow to the first light source exhaust port 231. The first exhaust duct 50 will be described later in detail.

The cooling mechanisms 5A and 5B are also configured to cool the wireless device 8, which is disposed in a position downstream of the first exhaust fan 61. Although will be described later in detail, in the cooling mechanisms 5A and 5B, the driven first exhaust fan 61 causes part of the discharged exhaust air to flow into a branch of the first exhaust duct 50 to the wireless device 8. The cooling mechanisms 5A and 5B then cool the wireless device 8 by exhausting heated air (exhaust air) having absorbed heat generated by the wireless device 8 out of the projector 1 through a second exhaust port (functional device exhaust port 72) formed in the cover member 7, which will be described later.

In the present embodiment, the wireless device 8 is heated to a temperature higher than the temperature of the exhaust air from the first exhaust fan 61. In the present embodiment, part of the exhaust air discharged from the first exhaust fan 61 is therefore used to cool the wireless device 8.

The cooling mechanism 5C causes outside air (air) sucked by a suction fan (sirocco fan, for example, but not shown) through the second light source suction port 242 to flow via a duct 321 to absorb heat generated by the second light source apparatus 32, as indicated by the arrow C. Specifically, a heat exchanger (not shown) using a heat pipe (not shown) that transfers heat generated by the second light source apparatus 32 is disposed in the duct 321. When air flows through the duct 321, heat exchange occurs in such a way that the heat generated by the second light source apparatus 32 is removed and the flowing air is heated accordingly. In the cooling mechanism 5C, a second exhaust fan 62 is driven to exhaust the heated air via a second exhaust duct 55, which will be described later, out of the exterior enclosure 2 through the second light source exhaust port 232. The cooling mechanism 5C thus cools the second light source apparatus 32. The second exhaust fan 62 is an axial fan in the present embodiment.

The second exhaust duct 55, which has a tubular shape, fixes the second exhaust fan 62 and allows the heated air (exhaust air) discharged from the second exhaust fan 62 to flow to the second light source exhaust port 232.

Figure 4:
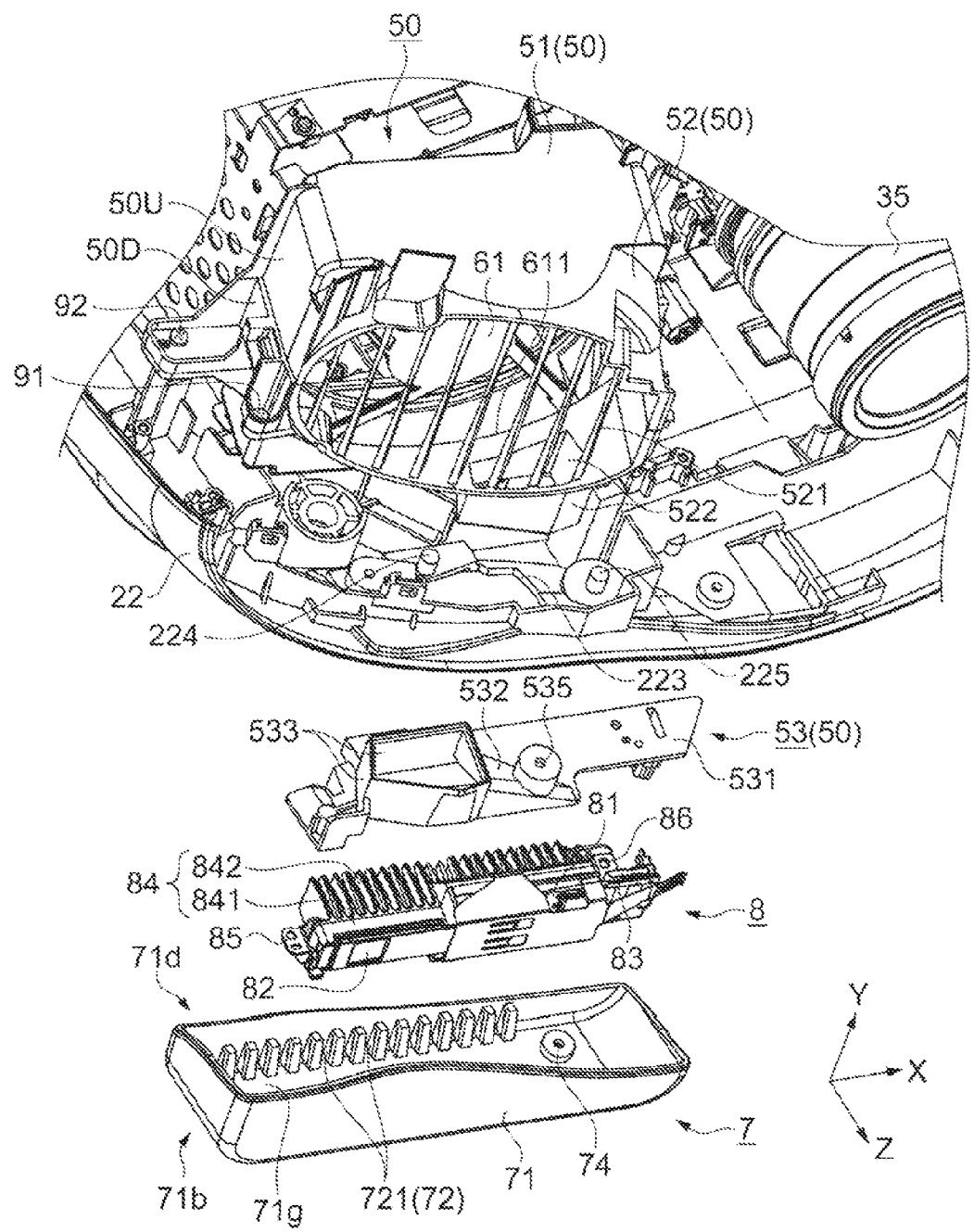
FIG. 4 is a partial exploded perspective view of portions around a wireless device.
Figure 5:
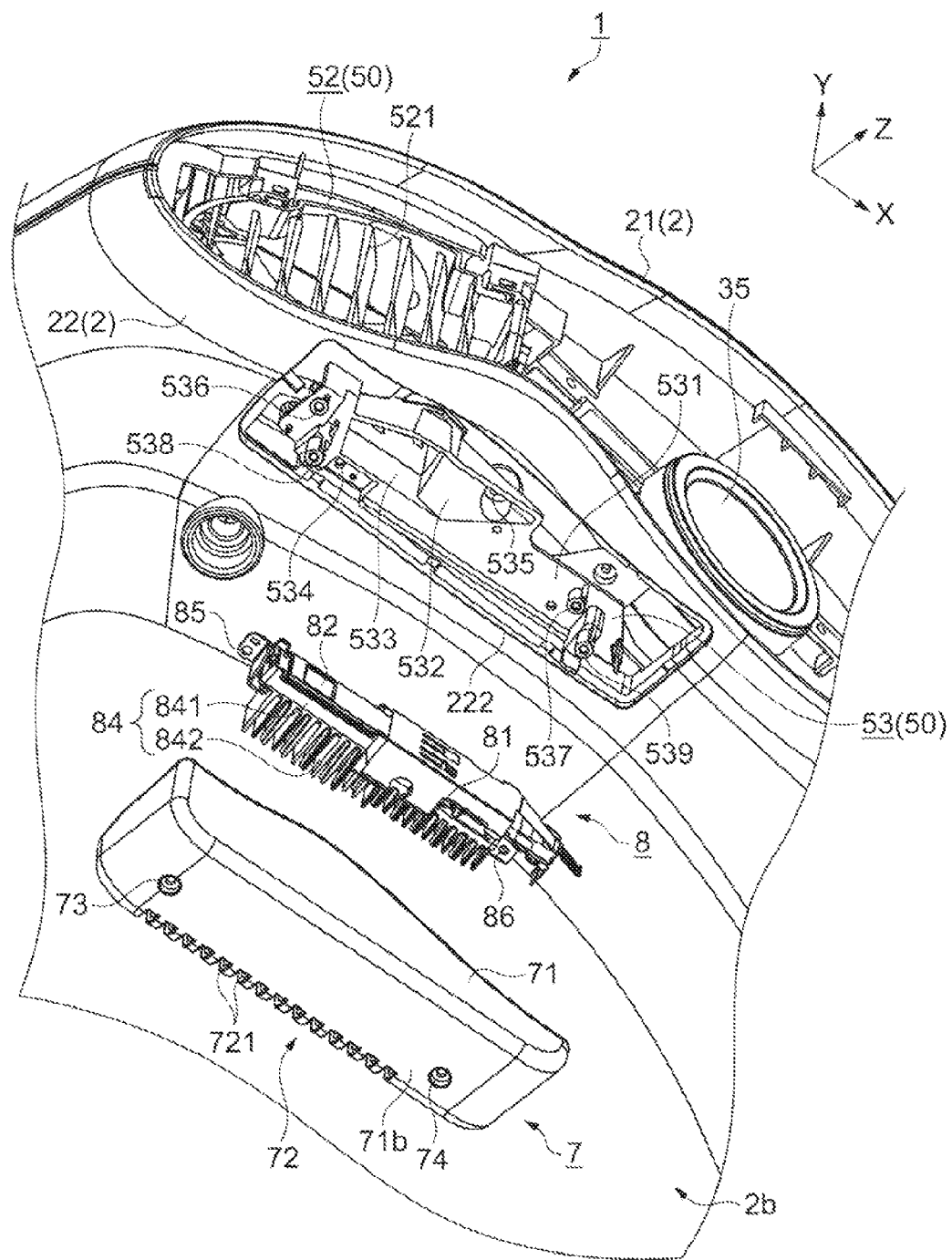
FIG. 5 is another partial exploded perspective view of portions around the wireless device.

FIGS. 4 and 5 are partial exploded perspective views of portions around the wireless device 8. FIG. 4 is an exploded perspective view of the first exhaust duct 50, the wireless device 8, and the cover member 7 viewed from above. FIG. 5 is an exploded perspective view of the first exhaust duct 50, the wireless device 8, and the cover member 7 viewed from below. The configuration, action, and assembly of each of the first exhaust duct 50, the wireless device 8, and the cover member 7 will be described with reference to FIGS. 3 to 5.

The first exhaust duct 50 has a duct body 51 as a base portion and the following two ducts as branches as shown in FIG. 4: an exhaust-port-side duct 52, which causes the exhaust air discharged from the first exhaust fan 61 to flow to the first light source exhaust port 231; and a functional-device-side duct 53, which causes the exhaust air to flow to the functional device (wireless device 8), which will be described later.

In the present embodiment, the duct body 51 and the exhaust-port-side duct 52 are formed by bonding an upper frame 50U and a lower frame 50D to each other. Specifically, each of the upper frame 50U and the lower frame 50D is so shaped that a portion that forms the duct body 51 has a substantially box-like shape and a portion that forms the exhaust-port-side duct 52 has a substantially cylindrical shape, and the duct body 51 and the exhaust-port-side duct 52 are formed by engaging the upper frame 50U and the lower frame 50D each other and bonding them to each other. The bonded upper frame 50U and lower frame 50D (duct body 51 and exhaust-port-side duct 52) are fixed to the lower case 22 with screws 91 and 92. The first exhaust fan 61 is fixed inside the duct body 51, and the exhaust air discharged from the first exhaust fan 61 flows into the exhaust-port-side duct 52.

Louvers 521 are so formed in the exhaust-port-side duct 52 that the louvers 521 extend in the vertical direction (Y direction) but are inclined leftward (in −X direction) with distance to the front side (in +Z direction), as shown in FIG. 4. In the present embodiment, the exhaust air having flown through the exhaust-port-side duct 52 is forcibly redirected in a forward, obliquely leftward direction and exhausted through the first light source exhaust port 231. The exhaust air exhausted through the first light source exhaust port 231 is directed also in the forward, obliquely leftward direction.

A connection portion 522, which has a polygonal tubular shape and protrudes downward, is formed as part of the lower frame 50D of the exhaust-port-side duct 52, as shown in FIG. 4. The functional-device-side duct 53, which will be described later, is connected to the connection portion 522.

A cover member opening 222, which has a substantially rectangular shape similar to the planar shape of the cover member 7, which will be described later, is formed in the lower case 22, as shown in FIG. 5. The functional-device-side duct 53, the wireless device 8, and the cover member 7 are assembled through the cover member opening 222.

An opening 223, which conforms to the shape of a connection portion 533, which will be described later, of the functional-device-side duct 53, is formed in the lower case 22, specifically, a portion thereof in the interior of (inside) the cover member opening 222, as shown in FIG. 4. Further, fixing portions 224 and 225, which have threaded holes (not shown) formed therein, are formed in the interior of the cover member opening 222, and the fixing portions 224 and 225 fix the functional-device-side duct 53 to the lower case 22 with screws.

The functional-device-side duct 53 is a channel that allows part of the exhaust air flowing through the exhaust-port-side duct 52 to flow through the connection portion 522 of the exhaust-port-side duct 52 into the functional-device-side duct 53 and then causes the exhaust air having flowed in to flow to the wireless device 8. A duct body 531, which has a flow portion 532, which is slightly raised upward (in +Y direction) to cause the exhaust air to flow, is formed as part of the functional-device-side duct 53, as shown in FIGS. 4 and 5.

The connection portion 533, which has a polygonal tubular shape and protrudes upward, is formed at a raised front end portion of the flow portion 532. The connection portion 533 has a shape similar to the shape of the connection portion 522 of the exhaust-port-side duct 52. Further, a hole 534 (FIG. 5) and a hole 535 (FIGS. 4 and 5), which are used to fix the duct body 531 to the lower case 22 with screws, are formed in the functional-device-side duct 53.

To connect the functional-device-side duct 53 to the exhaust-port-side duct 52 and fix the connected structure to the lower case 22, the functional-device-side duct 53 is first inserted through the cover member opening 222. The connection portion 533 is then inserted through the opening 223 of the lower case 22 and also inserted into the connection portion 522 of the exhaust-port-side duct 52.

Screws (not shown) are then inserted into the holes 534 and 535 of the functional-device-side duct 53 to allow the functional-device-side duct 53 to be fixed to the fixing portions 224 and 225 of the lower case 22. As a result, the functional-device-side duct 53 can be connected to the exhaust-port-side duct 52 and to the lower case 22. It is noted that FIG. 5 shows a state in which the functional-device-side duct 53 has been fixed to the lower case 22 (screws are not shown).

Fixing portions 536 and 537, which fix the wireless device 8, which will be described later, with screws, are formed as part of the functional-device-side duct 53, as shown in FIG. 5. Further, fixing portions 538 and 539, which fix the cover member 7, which will be described later, with screws, are formed as part of the functional-device-side duct 53.

The configuration and action of the wireless device 8 as the functional device in the present embodiment will now be schematically described.

The wireless device 8 as the functional device is a device that provides a predetermined function. The wireless device 8 in the present embodiment receives a wireless signal corresponding to image information transmitted from a transmission device (not shown) external to the projector 1. The wireless device 8 in the present embodiment is configured to be capable of WiHD-based (wireless high definition) high-speed wireless communication and connected to an HDMI (registered trademark) terminal, which is one of the group of connection terminals 245, and to the controller. The controller then controls the optical apparatus 3 based on a signal outputted from the wireless device 8 to cause the optical apparatus 3 to project an image corresponding to the wireless signal. The transmission device in the present embodiment is disposed in a position between the projector 1 and the projection surface.

The wireless device 8 includes a circuit substrate 81, which has a rectangular shape in a plan view and has a size substantially equal to the planar size of the wireless device 8, a receiver 82, which receives a wireless signal, a circuit element (not shown) that processes the received signal, a connection terminal 83, a control connection portion (not shown) connected to the controller, and a heat sink 84, as shown in FIGS. 4 and 5.

The receiver 82 is implemented on the circuit substrate 81 in a position in the vicinity of one end thereof in the longitudinal direction (on −X-direction side), and the connection terminal 83 is implemented on the circuit substrate 81 in a position in the vicinity of the other end thereof in the longitudinal direction (on +X-direction side). The heat sink 84 is disposed on the side (side facing rear surface 2*d*) of the circuit substrate 81 that faces away from the side where the receiver 82 is implemented (side facing front surface 2*c*). The heat sink 84 has a base portion 841, which is sized to be equal to the size of the circuit substrate 81 in a plan view, and a plurality of ribs 842, each of which has a plate-like shape and protrudes from the base portion 841. The plurality of ribs 842 are so formed that they extend in the direction parallel to the short sides of the circuit substrate 81 (upward and downward).

The wireless device 8 is disposed in a position downstream of the first exhaust fan 61 but upstream of the first light source exhaust port 231, as shown in FIGS. 3 and 4. In other words, the wireless device 8 is disposed in a position between the first exhaust fan 61 and the first light source exhaust port 231. Further, the position where the wireless device 8 is disposed is shifted from a channel through which exhaust air flows from a discharge port 611 of the first exhaust fan 61 to the first light source exhaust port 231. Specifically, in the present embodiment, the wireless device 8 is disposed in a position below the first exhaust fan 61 (on −Y-direction side). The position where the wireless device 8 in the present embodiment is disposed is also shifted downward (in −Y direction) from the first light source exhaust port 231.

Further, the wireless device 8 is so disposed that the receiver 82 faces the front surface 2*c* (in +Z direction) as shown in FIGS. 4 and 5. In other words, the wireless device 8 is so disposed that the receiver 82 faces in the direction in which a light flux exits out of the projection lens 35. Further, the connection terminal 83 is so disposed that it faces in the +X direction.

The wireless device 8 is so configured that the connection terminal 83 is connected to the HDMI (registered trademark) terminal (not shown), which is one of the group of connection terminals 245, via an HDMI (registered trademark) cable (not shown) and the control connection portion (not shown) is connected to the controller via a cable (not shown).

How to fix the wireless device 8 to the functional-device-side duct 53 will next be described.

It is assumed in the description that the functional-device-side duct 53 has been fixed to the lower case 22.

The wireless device 8 has screw fixation holes 85 and 86 in end portions thereof in the longitudinal direction, as shown in FIGS. 4 and 5. The wireless device 8 is inserted through the cover member opening 222, and the holes 85 and 86 are aligned with the fixing portions 536 and 537 formed as part of the functional-device-side duct 53. Screws (not shown) are then inserted into the holes 85 and 86 and screwed into the fixing portions 536 and 537. The wireless device 8 can thus fixed to the functional-device-side duct 53.

When the wireless device 8, which is disposed in a position below the first exhaust fan 61 (on −Y-direction side), is fixed to the functional-device-side duct 53, the wireless device 8 protrudes downward (in −Y direction) (is exposed) from the surface around the cover member opening 222 formed in the lower case 22 (see FIG. 3).

When the wireless device 8 is fixed to the functional-device-side duct 53, a space (not shown) is created between the upper side of the wireless device 8 and the duct body 531 of the functional-device-side duct 53, and the space allows air (exhaust air) having flowed through the connection portion 533 to flow along the upper side of the wireless device 8 via the flow portion 532.

The configuration, function, and fixation of the cover member 7 will next be described.

The cover member 7 is a member that covers the area where the wireless device 8 is disposed and forms the exterior of the projector, as shown in FIGS. 1, 4, and 5. In the present embodiment, the cover member 7 has a cover body 71 having a rectangular box-like shape that covers the outer shape of the wireless device 8. The shape of a front end portion of the box-shaped cover body 71 is so curved that it matches with the shape of the surface of the lower case 22, specifically, the shape thereof around the cover member opening 222.

The depth of the cover body 71 is so set that the cover body 71 covers the entire wireless device 8, which is so fixed that it protrudes downward (in −Y direction) from the surface around the cover member opening 222. In the present embodiment, the cover member 7, in which the wireless device 8 is disposed, causes the exterior enclosure 2 to have an area where the shape of the surface of the area differs from the shape of the surface therearound (area protruding downward).

A functional device exhaust port 72, which serves as the second exhaust port and is formed of a plurality of holes 721, is formed at a corner portion between a lower surface 71*b* and a rear surface 71*d* of the cover body 71. In other words, the functional device exhaust port 72 is so formed that it generally faces the rear surface 2*d* (side facing away from side where light flux exits out of projection lens 35). Holes 73 and 74, which are used to fix the cover member 7 to the functional-device-side duct 53, are formed in the lower surface 71*b* of the cover body 71 in end portions thereof in the longitudinal direction.

How to fix the cover member 7 to the functional-device-side duct 53 will next be described.

It is assumed in the description that the functional-device-side duct 53 has been fixed to the lower case 22, and that the wireless device 8 has been fixed to the functional-device-side duct 53.

The shape of the cover member 7 is first aligned with the shape of the cover member opening 222, and the cover member 7 is then inserted into the cover member opening 222, as shown in FIG. 5. The holes 73 and 74 are then aligned with the fixing portions 538 and 539 formed as part of the functional-device-side duct 53. Screws (not shown) are then inserted into the holes 73 and 74 and screwed into the fixing portions 538 and 539. The cover member 7 can thus be fixed to the functional-device-side duct 53.

When the cover member 7 is fixed to the functional-device-side duct 53, a space (not shown) is created between an inner surface 71*g* (FIG. 4) of the cover body 71 opposite to the lower surface 71*b*, and the lower side of the wireless device 8, and air (exhaust air) having flowed along the wireless device 8 flows through the space.

How the wireless device 8 is cooled will next be described.

The wireless device 8 is disposed in a position downstream of the first exhaust fan 61 and cooled by using part of the exhaust air discharged from the first exhaust fan 61, as described above.

Specifically, the first exhaust fan 61 is driven to discharge exhaust air through the discharge port 611 into the first exhaust duct 50. Part of the discharged exhaust air flows into the connection portion 522 of the exhaust-port-side duct 52 and then into the functional-device-side duct 53, which is connected to the connection portion 522. Specifically, when part of the exhaust air flows into the connection portion 522 of the exhaust-port-side duct 52, the exhaust air having flowed into the connection portion 522 flows into the connection portion 533 of the functional-device-side duct 53 and then flows into the space above the wireless device 8 via the flow portion 532.

The exhaust air having flowed into the space above the wireless device 8 reaches an upper portion of the heat sink 84 of the wireless device 8 and then flows toward a lower portion of the heat sink 84. The flow of the exhaust air absorbs heat generated by the wireless device 8 via the heat sink 84. The heated exhaust air having flowed along the heat sink 84 flows into the space between the wireless device 8 and the inner surface 71g of the cover member 7 and exits out of the projector 1 through the holes 721, which form the functional device exhaust port 72. The flow described above cools the wireless device 8.

The embodiment described above provides the following advantageous effects.

In the projector 1 according to the present embodiment, the wireless device 8 is heated to a temperature higher than the temperature of the exhaust air discharged from the first exhaust fan 61 in the cooling mechanisms 5A and 5B. The wireless device 8 is disposed in a position downstream of the first exhaust fan 61, and part of the exhaust air discharged from the first exhaust fan 61 flows to the wireless device 8. Further, in the present embodiment, the wireless device 8 is disposed in a position shifted from the discharge port 611 of the first exhaust fan 61. This configuration, in which the wireless device 8 is cooled but does not block the discharge port 611 of the first exhaust fan 61 or the entire first light source exhaust port 231, allows cooling of each member disposed in a position upstream of the first exhaust fan 61 in the cooling mechanisms 5A and 5B.

In the present embodiment, the first illumination system, the second illumination system, the electro-optical devices, the controller, the first light source apparatus 31, the power source apparatus 4, and other components disposed in positions upstream of the first exhaust fan 61 are cooled. The interior of the exterior enclosure 2 is also cooled.

Since the projector 1 according to the present embodiment, which uses the exhaust air discharged from the first exhaust fan 61 to perform positive-pressure-based cooling on the wireless device 8, can readily provide a necessary amount of cooling air unlike negative-pressure-based cooling, resulting in an improvement in the efficiency at which the wireless device 8 is cooled. Further, since a necessary amount of cooling air is readily provided unlike negative-pressure-based cooling, it is unnecessary to increase the speed of rotation of the first exhaust fan 61 to provide the necessary amount of cooling air, whereby noise of the projector 1 can be lowered.

The projector 1 according to the present embodiment includes the first exhaust duct 50, through which the exhaust air discharged from the first exhaust fan 61 flows, and the first exhaust duct 50 includes the exhaust-port-side duct 52, through which the exhaust air flows to the first light source exhaust port 231, and the functional-device-side duct 53, through which part of the exhaust air from the first exhaust fan 61 flows to the wireless device 8. The configuration allows part of the exhaust air discharged from the first exhaust fan 61 to efficiently flow to the wireless device 8 via the functional-device-side duct 53. The configuration further allows the remainder of the exhaust air to efficiently flow to the first light source exhaust port 231 via the exhaust-port-side duct 52. As a result, the wireless device 8 can be efficiently cooled, and each member disposed in a position upstream of the first exhaust fan 61 in the cooling mechanisms 5A and 5B can be efficiently cooled.

The projector 1 according to the present embodiment includes the cover member 7, which covers the wireless device 8, and the functional device exhaust port 72 is formed in the cover member 7. The configuration allows the exhaust air having flowed along the wireless device 8 and absorbed heat therefrom to be efficiently exhausted out of the exterior enclosure 2 through the functional device exhaust port 72, whereby the wireless device 8 can be efficiently cooled.

The projector 1 according to the present embodiment includes the cover member 7, which covers the wireless device 8. The cover member 7 can be shaped to be seamlessly connected to the surface of the exterior enclosure 2 even when the wireless device 8 is so disposed that it protrudes from the exterior enclosure 2 (lower case 22) as in the present embodiment. The exterior appearance of the exterior enclosure 2 can thus be improved.

In the projector 1 according to the present embodiment, since the functional device is the wireless device 8 capable of wireless communication, efficiently cooling the wireless device 8 allows stable wireless communication with an external apparatus. Further, since the transmission device in the present embodiment is disposed in a position between the projector 1 and the projection surface and the receiver 82 of the wireless device 8 faces the direction in which alight flux exits out of the projection lens 35, the number of obstacles that are present between the projector 1 and the projection surface (screen, for example) and interfere the wireless communication can be reduced for reliable communication.

The invention is not limited to the embodiment described above, and a variety of changes, improvement, and other modifications can be made thereto to the extent that they do not depart from the substance of the invention. Variations follow.

In the projector 1 according to the embodiment described above, the wireless device 8 is disposed in a position shifted from the discharge port 61 of the first exhaust fan 61, specifically, in a position below the first exhaust fan 61 (on −Y-direction side). The position where the wireless device 8 is disposed is not limited thereto and may be any position where the discharge port 611 of the first exhaust fan 61 or the entire first light source exhaust port 231 is not blocked and where the wireless device 8 can be cooled by part of the exhaust air discharged from the first exhaust fan 61.

In the projector 1 according to the embodiment described above, the wireless device 8 is cooled by the exhaust air having flowed through the first exhaust duct 50 including the functional-device-side duct 53. The first exhaust duct 50 is, however, not necessarily provided, and the configuration in which the wireless device 8 is cooled may be a configuration in which the cooling is performed by part of the exhaust air discharged from the first exhaust fan 61 and the exhaust air used in the cooling is exhausted through the first light source exhaust port 231 or a configuration in which the exhaust air used in the cooling is exhausted through another exhaust port.

The projector 1 according to the embodiment described above includes the cover member 7. The cover member 7 is, however, not necessarily provided. When no cover member 7 is provided, an exhaust port that functions in the same manner as the functional device exhaust port 72 is provided in the corresponding position of the exterior enclosure 2

(lower case 22). This configuration also allows improved cooling of the wireless device 8.

The projector 1 according to the embodiment described above is configured as the projector 1 to which the wireless device 8 is attached. Since the wireless device 8 is detachably fixed to the projector with screws, two types of projector, the projector 1 to which the wireless device 8 is attached and a projector to which no wireless device 8 is attached, can be readily provided, whereby a user has an increased range of options.

The projector 1 according to the embodiment described above includes the cover member 7, which covers the wireless device 8. The cover member 7 is detachably fixed to the projector 1 with screws. Therefore, to manufacture a projector to which no wireless device 8 is attached, the exterior enclosure 2 (upper case 21 and lower case 22) in the present embodiment can be used as a common part, and the cover member 7 can be replaced with a new cover member. Therefore, in accordance with whether or not the wireless device 8 is attached to the projector 1, the projector 1 can be manufactured in improved convenience, and the quality of the exterior appearance of the projector can be improved.

In the projector 1 according to the embodiment described above, the wireless device 8 is configured to be capable of WiHD-based high-speed wireless communication. The wireless device 8 does not necessarily receive a WiHD-based signal and may be configured to receive a wireless signal that allows another type of wireless communication, for example, wireless LAN (local area network) communication. Further, the wireless device 8 may be formed of a device that wirelessly transmits a signal to an external apparatus.

In the projector 1 according to the embodiment described above, the wireless device 8 is configured as a functional device, but the functional device is not limited to the wireless device 8 and may be another device that provides another function and is heated to a temperature higher than the temperature of exhaust air discharged from an exhaust fan.

The projector 1 according to the embodiment described above employs a reflective light modulator as each of the light modulators. Each of the light modulators is not limited thereto and can be a transmissive light modulator, a micromirror-based light modulator, or a light modulator based on another method. An example of the micromirror-based light modulator can be a DMD (digital micromirror device).

The projector 1 according to the embodiment described above employs a laser light source, which is a solid-state light source, as the light source apparatus. The light source apparatus is not limited thereto, and the solid-state light source may instead be an LED (light emitting diode), an organic EL (electro-luminescence) device, a silicon-based light emitting device, or any of a variety of other solid-state light emitting devices.

The entire disclosure of Japanese Patent Application No. 2013-117623, filed Jun. 4, 2013 is expressly incorporated by reference herein.

What is claimed is:

1. A projector comprising:
    a light source apparatus;
    a light modulator that modulates a light flux outputted from the light source apparatus in accordance with image information;
    a projection lens that projects the light flux modulated by the light modulator;
    an exterior enclosure that accommodates the light source apparatus, the light modulator, and the projection lens;
    an exhaust fan that exhausts air inside the exterior enclosure out thereof through an exhaust port provided in the exterior enclosure;
    a functional device that provides a predetermined function; and
    an exhaust duct including
        an exhaust-port-side duct through which exhaust air discharged from the exhaust fan flows to the exhaust port, and
        a functional-device-side duct through which the exhaust air discharged from the exhaust fan flows to the functional device;
    wherein
        an entrance to the functional-device-side duct, through which the exhaust air enters the functional-device-side duct, is formed in the exhaust-port-side duct,
        the exterior enclosure has a second exhaust port through which the exhaust air having flowed through the functional-device-side duct and flowed along the functional device is exhausted out of the exterior enclosure,
        the exhaust air is exhausted out of the exhaust port in a first direction being substantially the same as a direction in which the light flux exits the projection lens, and
        the exhaust air is exhausted out of the second exhaust port in a second direction being opposite to the direction in which the light flux exits the projection lens.

2. The projector according to claim 1, wherein the functional device is disposed in a position shifted from a discharge port of the exhaust fan.

3. The projector according to claim 1, wherein the functional device is detachably disposed.

4. The projector according to claim 3, wherein the exterior enclosure includes a detachable cover member that covers an area where the functional device is disposed.

5. The projector according to claim 4, wherein the cover member has the second exhaust port.

6. The projector according to claim 1, wherein the functional device is a wireless device capable of wireless communication, and a receiver or a transmitter of the wireless device faces in a direction in which a light flux exits out of the projection lens.

7. The projector according to claim 1, wherein the exhaust fan is disposed in the exhaust duct.

8. The projector according to claim 1, wherein the exhaust port is formed in a first surface of the exterior enclosure and the second exhaust port is formed in a second surface of the exterior enclosure that intersects the first surface.

9. The projector according to claim 1, wherein
    the exhaust fan draws air over the light source apparatus and the light modulator, and is disposed in a position downstream of the light source apparatus and the light modulator, and
    the entrance to the functional-device-side duct is disposed in a position downstream of the exhaust fan, the light source apparatus, and the light modulator.

\* \* \* \* \*